(12) United States Patent
Rakshit (10) Patent No.: US 11,794,433 B2
(45) Date of Patent: Oct. 24, 2023

(54) IN-VEHICLE THREE DIMENSIONAL (3D) PRINTER CONTROL

(71) Applicant: International Business Machines Corporation, Armonk, NY (US)

(72) Inventor: Sarbajit K. Rakshit, Kolkata (IN)

(73) Assignee: International Business Machines Corporation, Armonk, NY (US)

( * ) Notice: Subject to any disclaimer, the term of this patent is extended or adjusted under 35 U.S.C. 154(b) by 463 days.

(21) Appl. No.: 17/023,647

(22) Filed: Sep. 17, 2020

(65) Prior Publication Data
US 2022/0080688 A1    Mar. 17, 2022

(51) Int. Cl.
| | | |
|---|---|---|
| *B29C 64/393* | (2017.01) | |
| *B29D 30/54* | (2006.01) | |
| *B29C 73/00* | (2006.01) | |
| *B29C 64/106* | (2017.01) | |
| *G06T 7/579* | (2017.01) | |
| *G06T 7/62* | (2017.01) | |
| *G06T 7/68* | (2017.01) | |
| *B29L 30/00* | (2006.01) | |
| *B33Y 30/00* | (2015.01) | |
| *B33Y 80/00* | (2015.01) | |

(52) U.S. Cl.
CPC ............ *B29D 30/54* (2013.01); *B29C 64/106* (2017.08); *B29C 64/393* (2017.08); *B29C 73/00* (2013.01); *G06T 7/579* (2017.01); *G06T 7/62* (2017.01); *G06T 7/68* (2017.01); *B29L 2030/002* (2013.01); *B33Y 30/00* (2014.12); *B33Y 80/00* (2014.12)

(58) Field of Classification Search
CPC ....... B29C 64/106; B29C 73/00; B29C 73/02; B29D 30/54; B29L 2030/002; B33Y 10/00; B33Y 30/00; B33Y 80/00; G06T 7/579; G06T 7/62; G06T 7/68
See application file for complete search history.

(56) References Cited

U.S. PATENT DOCUMENTS

| | | |
|---|---|---|
| 2006/0220814 A1 | 10/2006 | Kawashima |
| 2012/0241067 A1 | 9/2012 | D'Oria |
| 2016/0185040 A1 | 6/2016 | Costlow |
| 2022/0063184 A1* | 3/2022 | Hikmet ................ B29C 64/209 |

(Continued)

FOREIGN PATENT DOCUMENTS

| | | |
|---|---|---|
| CN | 101074014 A | 11/2007 |
| DE | 102016200623 A | 7/2017 |

OTHER PUBLICATIONS

"A Tire for Every Season", Continental, The Future in Motion, 4 pages, downloaded from the internet on Mar. 12, 2020, <https://www.continentaltire.com/>.

(Continued)

*Primary Examiner* — Yuhui R Pan
(74) *Attorney, Agent, or Firm* — David B. Woycechowsky (57) ABSTRACT

Technology for controlling in-vehicle three dimensional (3D) printer(s) that replenish road engaging surfaces of the vehicle assembly. In some embodiment the 3D printer is controlled to replenish the road engaging surface while the vehicle is being driven. In some embodiments, an Internet of Things (IoT) sensor is used to detect wear on the road engaging surface to help control the location(s) where the 3D printer adds the additive material.

5 Claims, 4 Drawing Sheets

(56) References Cited

U.S. PATENT DOCUMENTS

2022/0332071 A1\* 10/2022 Roy .................. B29C 64/20

OTHER PUBLICATIONS

"Three Causes of Tire Damage", downloaded from the internet on Mar. 12, 2020, 3 pages, <https://www.pepboys.com/auto-care/tire/primary-causes of-tire-damage>.
Low, Cherlynn., "Michelin's 3D-printed tire is as stunning as it is futuristic", Aug. 7, 2017, 7 pages, <https://www.engadget.com/2017/08/07/michelin-vision-biodegradable-3d-print-airless-tire/>.
Scott, C., "Goodyear Unveils Concept for a 3D Printed Tire That Cleans the Air", Mar. 7, 2018, 2 pages, <https://3dprint.com/206002/goodyear-3d-printed-tire/>.

\* cited by examiner

S702 — RECEIVING A SENSOR DATA SET, FROM A SET OF SENSOR(S), INCLUDING INFORMATION INDICATIVE OF A CONDITION OF A FIRST TIRE TREAD PORTION OF A FIRST TIRE OF A MOTOR VEHICLE ASSEMBLY (MVA) WHILE THE MVA IS BEING DRIVEN

S704 — DETERMINING THAT THE FIRST TIRE TREAD PORTION NEEDS REPLENISHMENT BASED, AT LEAST IN PART, UPON THE SENSOR DATA

S706 — RESPONSIVE TO THE DETERMINATION THAT THE FIRST TIRE TREAD PORTION NEEDS REPLENISHMENT, CONTROLLING A FIRST 3D PRINTER THAT IS SECURED WITH RESPECT TO THE VEHICLE FRAME TO DEPOSIT ADDITIVE MATERIAL ON THE FIRST TREAD PORTION TO REPLENISH THE FIRST TREAD PORTION WHILE THE VEHICLE IS BEING DRIVEN

FIG. 7

IN-VEHICLE THREE DIMENSIONAL (3D) PRINTER CONTROL

BACKGROUND

The present invention relates generally to the field of Internet of Things sensors mounted in motor vehicles (for example, driverless school busses), and also to the field of three dimensional printers.

Motor vehicles with pneumatic tires and/or solid tires are well known. It is known that tires generally have treads (sometimes herein referred to as road engaging surfaces) over an exterior, cylindrically shaped surface, and that this tread surface is subject to wear from driving the vehicle over roads. It is further known that too much wear can cause the tire to slip, or fail catastrophically, and that this means that tires should be replaced when their treads wear down too much. For example, one known way to check tire tread depth for excessive wear is called the penny test. Under the penny test, one inserts a penny into a tire's tread groove with Lincoln's head upside down. If all of Lincoln's head is visible (that is, located outside of the tread groove) the penny test indicates that the tire should be replaced. It is noted that this document should not be taken as an endorsement of this prior art tire tread wear testing method.

The Wikipedia entry for "3D printing" (as of 23 Feb. 2020) states as follows: "The 3D printing process builds a three-dimensional object from a computer-aided design (CAD) model, usually by successively adding material layer by layer, which is why it is also called additive manufacturing, unlike conventional machining, casting and forging processes, where material is removed from a stock item (subtractive manufacturing) or poured into a mold and shaped by means of dies, presses and hammers. The term "3D printing" covers a variety of processes in which material is joined or solidified under computer control to create a three-dimensional object, with material being added together (such as liquid molecules or powder grains being fused together), typically layer by layer. . . . As of 2019 the precision, repeatability and material range have increased to the point that some 3D-printing processes are considered viable as an industrial-production technology, whereby the term additive manufacturing can be used synonymously with '3D printing'. One of the key advantages of 3D printing is the ability to produce very complex shapes or geometries, and a prerequisite for producing any 3D printed part is a digital 3D model or a CAD file. The most-commonly used 3D-printing process (46% as of 2018) is a material extrusion technique called fused deposition modeling (FDM). While FDM technology was invented after the other two most popular technologies, stereolithography (SLA), and selective laser sintering (SLS); FDM is typically the most inexpensive of the three by a large margin, which lends to the popularity of the process. The term '3D printing' originally referred to a process that deposits a binder material onto a powder bed with inkjet printer heads layer by layer. More recently, the popular vernacular has started using the term to encompass a wider variety of additive-manufacturing techniques such as electron-beam additive manufacturing and selective laser melting." (footnotes omitted)

US patent application 2016/0185040 ("Costlow") states as follows: "An apparatus, system, and method for disposing green rubber, via 3D Printing or additive manufacturing, are provided. The apparatus includes at least a housing, a nozzle, and a heating element. Green rubber is forced through the nozzle and deposited in an iterative build process. The apparatus may be used in a variety of applications, including tire applications. . . . Examples of three dimensional structures include, without limitation, bellows, consumer goods, dampers, industrial components (such as gaskets, grommets, or o-rings), shoe components, and tire components (such as a tread or lug)."

SUMMARY

According to an aspect of the present invention, a motor vehicle assembly (MVA) includes: a vehicle frame; a first tire, with the first tire including a first tread portion; a first three dimensional (3D) printer; and a 3D printer control module. The first 3D printer is structured and connected to deposit additive material suitable for replenishing the first tread portion under control of the 3D printer control module. The 3D printer is secured to the vehicle frame in a location such that its additive material is deposited on the first tire tread portion.

According to a further aspect of the present invention, there is a method, computer program product and/or system that performs the following operations (not necessarily in the following order): (i) providing a motor vehicle assembly (MVA) including a vehicle frame, a first tire, with the first tire including a first tread portion, a first three dimensional (3D) printer, and a 3D printer control module, with the first 3D printer being structured and connected to deposit additive material suitable for replenishing the first tread portion under control of the 3D printer control module, and with the 3D printer being secured to the vehicle frame in a location such that its additive material is deposited on the first tire tread portion; (ii) driving the MVA; and (iii) during the driving of the MVA, depositing additive material from the first 3D printer onto the first tread portion to replenish the first tread portion.

According to a further aspect of the present invention, there is a method, computer program product and/or system that performs the following operations (not necessarily in the following order): (i) receiving a sensor data set, from a set of sensor(s), including information indicative of a condition of a first tire tread portion of a first tire of a motor vehicle assembly (MVA) while the MVA is being driven; (ii) determining that the first tire tread portion needs replenishment based, at least in part, upon the sensor data set; and (iii) responsive to the determination that the first tire tread portion needs replenishment, controlling a first 3D printer that is secured with respect to the vehicle frame to deposit additive material on the first tread portion to replenish the first tread portion while the vehicle is being driven.

DETAILED DESCRIPTION

Some embodiments of the present invention are directed to a motor vehicle including a 3D printer to add material to the tire tread in a controlled manner to counter tire wear. Also, disclosed is a method of adding additive material to a tire tread, by an in-vehicle 3D printer, while the vehicle is being driven, and computer software for controlling the method of adding additive material to a tire tread, by an in-vehicle 3D printer, while the vehicle is being driven.

Figure 1:
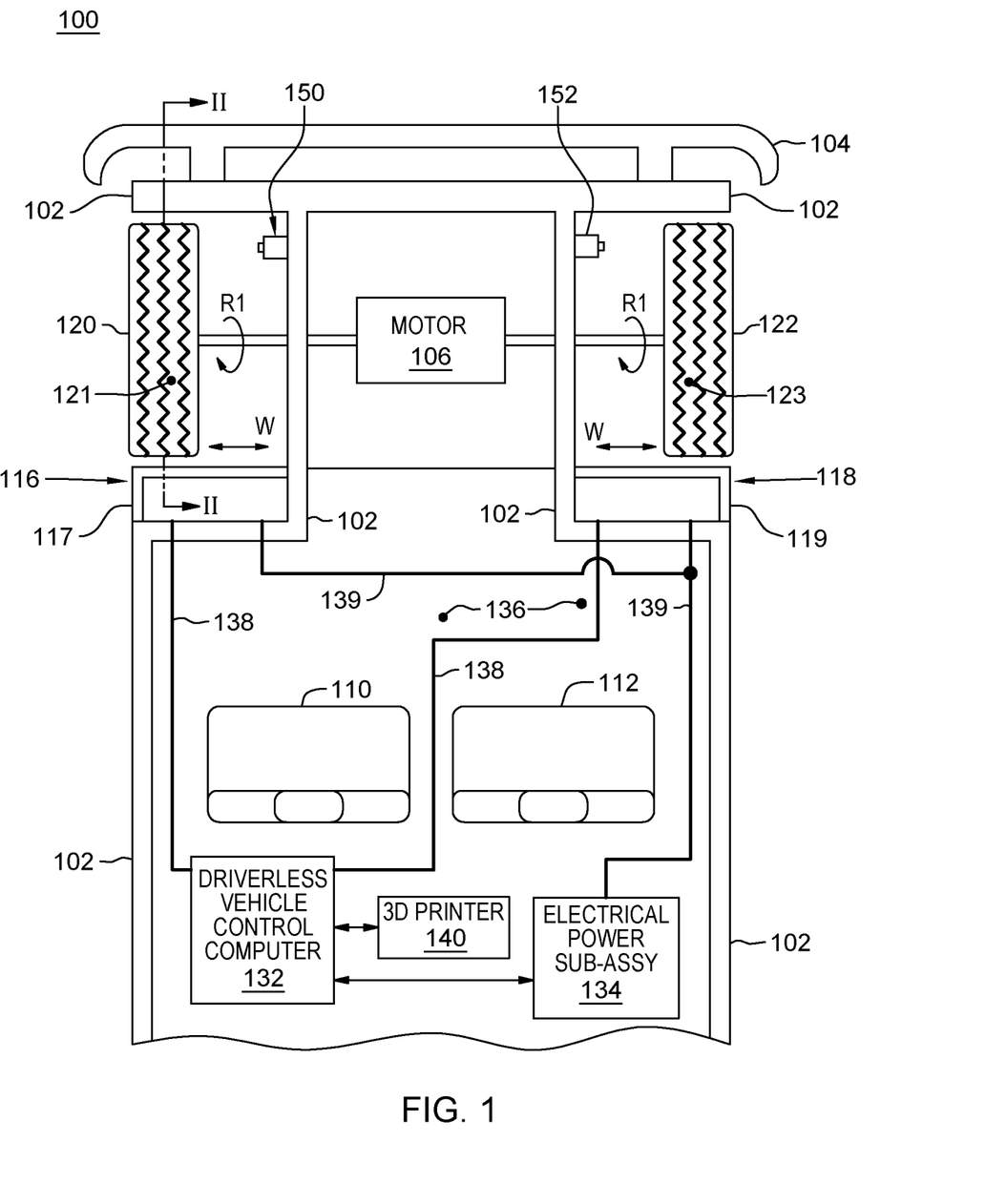
FIG. 1 is a top view of a portion of a first embodiment of a motor vehicle according to the present invention.
Figure 2:
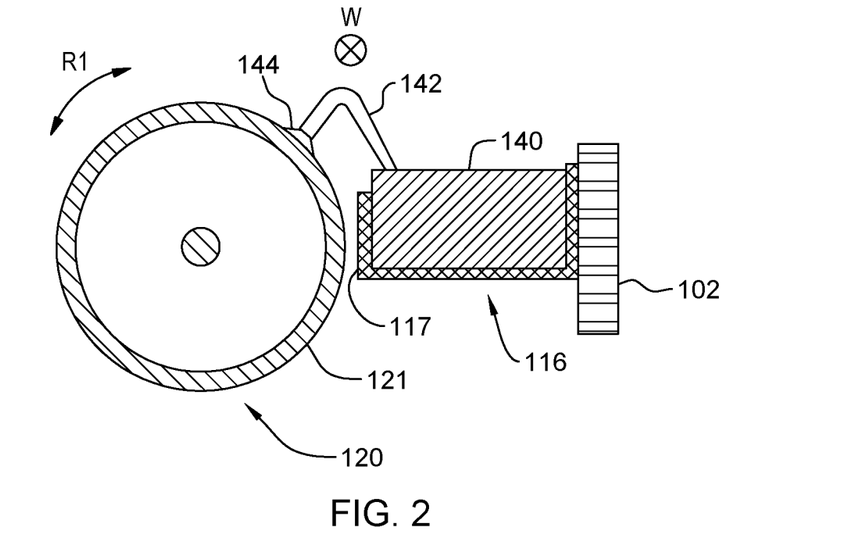
FIG. 2 is a left side view of a front driver side wheel portion of the first embodiment motor vehicle.
Figure 3:
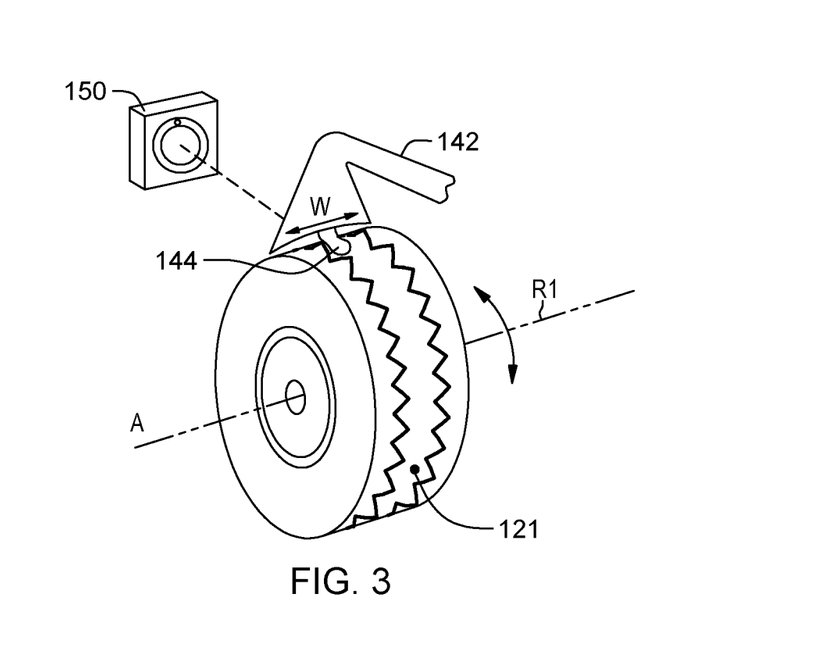
FIG. 3 is a perspective view of the front driver side wheel portion of the first embodiment motor vehicle.

As shown in FIGS. 1 to 3, motor vehicle assembly 100 includes: chassis (also sometimes referred to herein as "vehicle frame") 102; front fender sub-assembly 104; motor 106; driver's seat sub-assembly 110; passenger's seat sub-assembly 112; front driver side printer-securing recess 116; front driver side printer-securing wall 117; front passenger side printer-securing recess 118; front passenger side printer-securing wall 119; front driver side tire sub-assembly 120 (which rotates in the R1 direction about axis A and has a tire width in the dimension W); front driver side tire tread surface 121; front passenger side tire sub-assembly 122 (which rotates in the R1 direction about axis A and has a tire width in the dimension W); front passenger side tire tread surface 123; driverless vehicle control computer 132; electrical power sub-assembly 134; passenger compartment floor member 136; 3D printer control communication lines 138; 3D printer power lines 139; 3D printer 140 (including nozzles sub-assembly 142 as shown in FIGS. 2 and 3); front driver side camera 150; and front passenger side camera 152.

Vehicle frame 102, front fender sub-assembly 104, motor 106, driver's seat sub-assembly 110, passenger's seat sub-assembly 112, electrical power sub-assembly 134 and passenger compartment floor member 136 are vehicle components that are the same as the they are in conventional vehicles. In various embodiments, these components may take a wide variety of forms now known or to be developed in the future. For example, motor 106 is an internal combustion engine, but could also be an electric motor or a hybrid motor. The seats could be omitted (for example, in driverless vehicle embodiments used for package deliveries).

At least some embodiments of the present invention focus on features such as the printer-securing recesses 116, 118, tire tread surfaces 121, 123, driverless vehicle control computer 132, 3D printer control communication lines 138, 3D printer power lines 139, 3D printer 140 and cameras 150, 152. These design features, and some of the possible variations and/or alternatives to them, will be discussed in detail in the following paragraphs.

In this embodiment there is but one 3D printer 140, and one set of nozzle(s) 142, to serve to replenish the treads of all four vehicle tires (of course, only the front tires are shown in FIG. 1). Alternatively, the vehicle may have more, or fewer, than four tires. In some embodiments, it may be only a subset of the tires that can have their respective treads replenished by the 3D printer. As will be discussed below, in connection with the embodiment of FIGS. 4 and 5, there may be a separate, dedicated 3D printer for each tire. In assembly 100, the 3D printer must be physically moved from the position shown in FIG. 1 to the various recesses 116, 118 by a person in order to service the treads of the various tires 121, 123. Alternatively, the 3D printer could be moved by electromechanical devices or a robot. As a further alternative, there may be a single centrally located 3D printer that feeds a respective set of nozzle(s) for each tire.

FIG. 2 shows the 3D printer as it is positioned in recess 116 in order to replenish tread 121 with additive material 144. In this embodiment, the additive material dries and cures sufficiently quickly so that the tread may be replenished by thin layer(s) of additive material 144 so long as the vehicle is being driven between 5 and 15 miles per hour. Alternatively, some embodiments may not be able to be used when the vehicle is being driven (for example, some embodiments may require that the tire to be replenished is suspended above the ground surface by a jack). As best shown in FIG. 3, in this embodiment, the print head of 3D printer 140 takes the form of a row of nozzles that extends in the W direction all the way across the width of the tire. This way, the print head does not need to move relative to the 3D printer. Alternatively, the print head may be structured to move in the W direction, and/or in the radial direction of the tire, while tread replenishment printing is taking place.

In this embodiment, electrical power sub-assembly 134, which provides electrical power to electrical components of vehicle 100 also powers 3D printer 140 through printer power lines 139 when the printer is secured in any of the recesses 116, 119. Alternatively, the 3D printer(s) may be battery powered.

Now a method of replenishing a tire tread using the 3D printer 140, while vehicle 100 is being driven, will be discussed. As shown in FIGS. 1 and 3, camera 150 intermittently sends video images of tread 121 to driverless vehicle control computer (DVCC) 132, which has machine logic (not separately shown) to determine when portions of tread 121 have worn down and require replenishment. Alternatively, other types of sensors, other than video cameras, may be used to monitor the tire to: (i) detect that tread replenishment is needed; and/or (ii) monitor the tread replenishment operation as it takes place. When this occurs, the DVCC alerts the occupants of the vehicle and instructs them to place 3d printer 140 in the printer recess proximate to the front driver side tire, which, in this example is recess 116. FIG. 2 shows 3D printer 140 in place after it has been put in recess 116. As shown in FIG. 2, the tread is replenished with additive material 144 through nozzles sub-assembly 142. As best shown in FIG. 3, nozzles sub-assembly 142 extends in the W direction across the entire width of tire 120. The width dimension location(s) of the portions of the tread that need replenishment are determined by the DVCC, which controls 3D printer 140 to lay bead(s) of additive material through the correct nozzles to control the W direction placement of the bead of additive material. Because, in this embodiment, the bead of additive material is applied when the car is being driven, this bead may be controlled to form a very thin layer of new material so that the additive material dries and/or cures sufficiently so that it is not displaced by contact with the roadway as the tire rotates about axis A.

Because, in this embodiment, the tread replenishment takes place while the vehicle is being driven, the machine logic of the DVCC must carefully choose when to lay the bead of replenishment material. In this embodiment, the machine logic of the DVCC only lays a bead when the following conditions are met: (i) ambient temperature value is between 20 and 80 degrees Fahrenheit; (ii) vehicle speed between 10 and 30 miles per hour; (iii) the roadway is dry; (iv) the angular position of the tire about axis A is an angular position where tread replenishment is required; and (v) the tires are in a straight ahead position (that is, not being steered in a turn). The specific values and value ranges in this example, are, of course, only illustrative. Alternatively, different parameters may be monitored to determine, by machine logic, when to lay the bead of additive material and when to forbear from laying a bead of additive material. Ongoing video received from camera 150 (see FIG. 3) allows the DVCC to determine when the replenishment operation is complete because a sufficient number of layers of additive material has respectively been laid in the spots on tread 121 that require it. In this embodiment, the flow rate of additive material from nozzles 142 is controlled based on the rotational speed of the tire so that each layer of additive material newly deposited on the tread will have: (i) at least approximately the same thickness; and (ii) a sufficiently small thickness so that the additive material dries and cures between the time it is deposited on the tire and the time the newly deposited layer first makes contact with the roadway.

In some embodiments, the additive material may be a pressure curable material so that the compressive force exerted by the roadway upon the tire actually helps the additive material to dry and cure.

When video from camera 150 indicates that the tread is fully replenished, the DVCC instructs the vehicle occupants to put the 3D printer back in its storage location shown in FIG. 1.

Some embodiments of the present invention recognize the following facts, potential problems and/or potential areas for improvement with respect to the current state of the art: (i) when vehicles are running on the road, then there will be a wear and tear in the vehicle tires; (ii) the wear and tear of vehicle tire is depending on rubbing force between the road surface and vehicle tire surface; (iii) over a period of a time, if proper maintenance is not done in a timely manner, then there will be a major problem in the vehicle, and it might cause an accident; (iv) if proper maintenance is not done, then because of wear and tear vehicle tires will get damaged, and this might cause accident and damage in the vehicle; and/or (v) there is a need a method and system by which, vehicle tires will be repaired automatically when any defect is detected, so that, near real-time proactive maintenance will be performed on the vehicle tires, and hence, major damage in the vehicle tires can be prevented.

Some embodiments of the present invention may include one, or more, of the following operations, features, characteristics and/or advantages: (i) method and system for self-repairing vehicle tires; (ii) a method and system which will be using inbuild 3D printing machine along with vehicle tires assembly; (iii) when IoT enabled system detects any defect in the vehicle tire, then vehicle tires will be repaired automatically on near real-time basis; (iv) proactive maintenance will be performed on the vehicle tires, and hence, major damage in the vehicle tires can be prevented in a timely fashion; (v) for some heavy duty vehicles, like transportation vehicles, the changes of tire damage is more, so, some embodiments can identify any changes of damage in a proactive manner; and/or (vi) some embodiments can ratify the changes in tire tread damage before they cause a vehicular accident or catastrophic failure of a tire.

Some embodiments of the present invention may include one, or more, of the following operations, features, characteristics and/or advantages: (i) IoT (Internet of Things) and ultrasound scanning enabled system will be detecting problem with vehicle tires on real-time basis; (ii) based on pattern of defect and wear and tear, the vehicle tires will automatically be rectified in a timely fashion with inbuilt 3D printing system; (iii) 3D printing modules will be installed in the vehicle chassis, near each vehicle wheel mounting, when any defect is identified, the 3D printing module will be rectifying the defective area; (iv) the propagation of defect in the vehicle tires can be prevented in a timely fashion; and/or (v) based on the pattern of identified defect in the vehicle tires, vehicle speed, current location during the journey, and predicted time required to rectify the defect in the vehicle tires, the autonomous vehicle will be identifying the stop location, so that passenger can take a break, and vehicle can perform self-repairing of the tires with 3D printing method.

Some embodiments of the present invention may include one, or more, of the following operations, features, characteristics and/or advantages: (i) based on the pattern of defect in the vehicle tires, the 3D printing module will be rectifying the problem; (ii) if required, the vehicle will be changing the relative position of the wheels (vehicle will be moving so that wheel can change the position based on rotation), so that rectification can be done in proper places of the vehicle tires; (iii) the IoT and ultrasound scanning system will be evaluating if the proper rectification is done in the vehicle tires, and accordingly the vehicle will be ready for travelling; (iv) based on the relative position and pattern of defect in the vehicle tires, the autonomous vehicle will decide if the vehicle needs to be stopped for repairing or the repairing can be done with running condition; and/or (v) the 3D printing module will also be having a water jet cleaning module, when vehicle tire needs to be corrected, then water jet system will be ensuring proper cleaning of the target area and then 3D printing based correction will be done.

Figure 4:
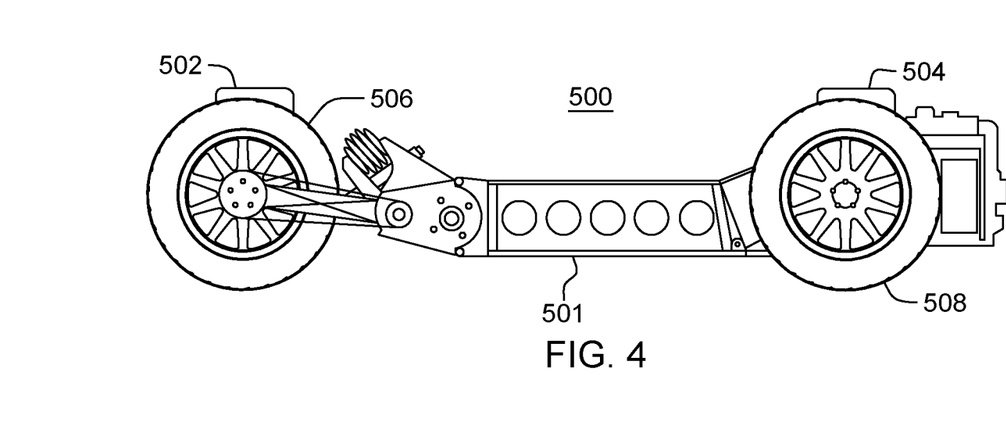
FIG. 4 is a side view of a portion of a second embodiment of a motor vehicle according to the present invention.
Figure 5:
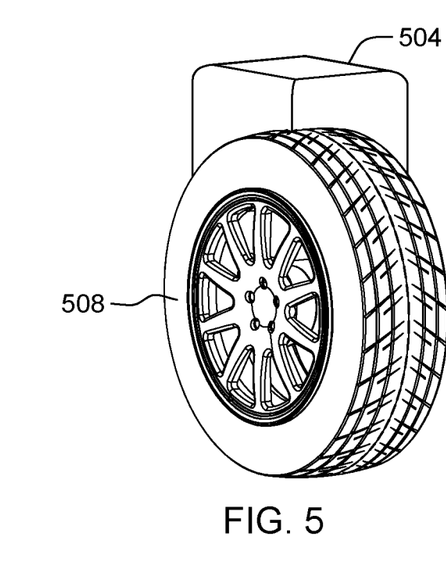
FIG. 5 is a perspective view of a wheel portion of the second embodiment motor vehicle.

As shown in FIGS. 4 and 5, motor vehicle assembly 500 includes: vehicle frame 501; front driver side 3D printer 502; front driver side tire 506; rear driver side 3D printer 504; and rear driver side tire 508.

In motor vehicle assembly 500, the 3D printing modules will be mounted with the vehicle chassis, and the 3D printing module will be placed over each of the wheels. IoT sensors or camera feed will be analyzing the defect in the vehicle tire, and accordingly printing will be done to rectify the problem.

Implementation steps for an embodiment of the present invention will now be discussed. Vehicle tires have IoT (Internet of Things) sensor-based modules. An autonomous vehicle gathers the IoT sensor feed from each of the vehicle tires, and, accordingly, identifies the pattern of wear and tear or defects in the vehicle tires. The vehicle computing system analyzes the IoT feed, and, accordingly, identifies the type of defect with the vehicle tires, like wear and tear, broken, crack is detected, etc. Based on predefined standards about the condition of vehicle tires, the vehicle computing system determines what type of repair is required and priority order for repairing the vehicle tires. Along with the vehicle chassis, 3D printing module(s) are attached to repair the vehicle tires. In some embodiments, for each wheel there will be one 3D printing repairing module. The 3D printing material will be stored in the vehicle, during 3D printing operation, the printing material will be laid over the defective area of vehicle tire. In some embodiments, the material will be same as the material used for printing vehicle tire.

Some embodiments of the present invention may include one, or more, of the following operations, features, characteristics and/or advantages: (i) while the vehicle is running, the computing system will be analyzing the pattern of defect the vehicle tire; (ii) an autonomous vehicle identifies the vehicle and travel specific information, like, current speed of the vehicle, current location, and time required to rectify the problem in the vehicle tire; (iii) the autonomous vehicle will be validating if the vehicle needs to be stopped to repair the identified problem with the vehicle tire or during running contrition the repairing can be done; (iv) if the vehicle needs to be stopped, then the vehicle will be identifying appropriate place, or will move in a parking area where the vehicle can perform self-repairing the vehicle tire; (v) the defect type will be analyzed, and will be identifying how long the defect can be sustained without repairing; (vi) when autonomous vehicle identifies immediate repairing is required, then the vehicle will be identifying appropriate place and with 3D printing module rectification will be done; (vii) the 3D printing module will also be having a scanning module, which will be scanning the defective portion, and accordingly be printing the defective area; and/or (viii) after vehicle tire repairing is done, then the vehicle will be ready to travel with rectified vehicle tire.

Some embodiments of the present invention may include one, or more, of the following operations, features, characteristics and/or advantages: (i) uses an IoT and ultrasound scanning enabled system to detect problems with vehicle tires on a frequent basis (for example, a real time basis); (ii) based on the detected pattern of defect and wear and tear, the vehicle tires will automatically be rectified in a timely fashion with inbuilt 3D printing system; (iii) 3D printing modules will be installed in the vehicle chassis, near each vehicle wheel mounting, when any defect is identified, the 3D printing module will be rectifying the defective area; and/or (iv) the 3D printer will be part of the vehicle chassis, and will be tracking any uneven wear and tear, crack etc., and will be identifying appropriate timing when 3D printing.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (for example, light pulses passing through a fiber-optic cable), or electrical signals transmitted through a wire.

A "storage device" is hereby defined to be anything made or adapted to store computer code in a manner so that the computer code can be accessed by a computer processor. A storage device typically includes a storage medium, which is the material in, or on, which the data of the computer code is stored. A single "storage device" may have: (i) multiple discrete portions that are spaced apart, or distributed (for example, a set of six solid state storage devices respectively located in six laptop computers that collectively store a single computer program); and/or (ii) may use multiple storage media (for example, a set of computer code that is partially stored in as magnetic domains in a computer's non-volatile storage and partially stored in a set of semiconductor switches in the computer's volatile memory). The term "storage medium" should be construed to cover situations where multiple different types of storage media are used.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 6:
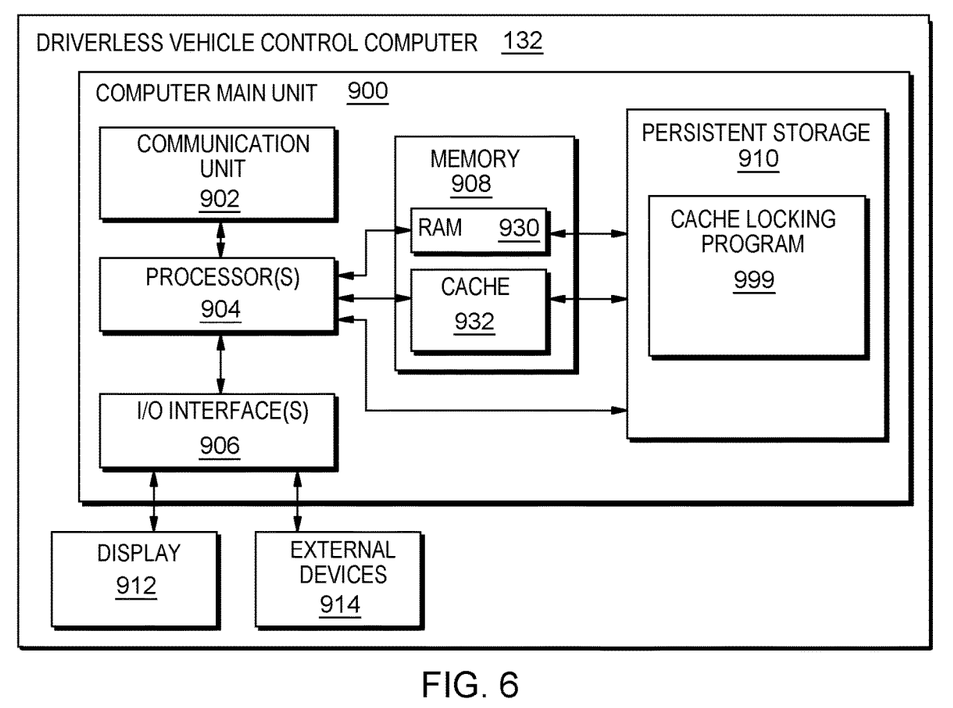
FIG. 6 is a block diagram of a driverless vehicle control computer.

As shown in FIG. 6, driverless vehicle control computer (DVCC) 132 includes: computer main unit 900; communication unit 902; processor set 904; input/output (I/O) interface set 906; memory 908; persistent storage 910; display 912; external device(s) 914; random access memory (RAM) 930; cache 932; and program 999. The machine logic that controls detection of tire tread wear and/or tread replenishment is structured and/or programmed into: (i) program 999, to the extent that it is software; and (ii) processor set 904 to the extent that it is implemented in hardware. It is also note that the control computer may be "distributed" such that the driverless control computer communicates with remote computer(s) and/or cloud(s) to use machine logic to control the 3D printer and/or detect tread wear.

The DVCC may be a laptop computer, tablet computer, netbook computer, personal computer (PC), a desktop computer, a personal digital assistant (PDA), a smart phone, or any other type of computer (see definition of "computer" in Definitions section, below). Program 300 is a collection of machine readable instructions and/or data that is used to create, manage and control certain software functions. The DVCC is shown as a block diagram with many double arrows. These double arrows (no separate reference numerals) represent a communications fabric, which provides communications between various components of the DVCC. This communications fabric can be implemented with any architecture designed for passing data and/or control information between processors (such as microprocessors, communications and network processors, etc.), system memory, peripheral devices, and any other hardware components within a computer system. For example, the communications fabric can be implemented, at least in part, with one or more buses.

Memory 908 and persistent storage 910 are computer-readable storage media. In general, memory 908 can include any suitable volatile or non-volatile computer-readable storage media. It is further noted that, now and/or in the near future: (i) external device(s) 914 may be able to supply, some or all, memory for the DVCC; and/or (ii) devices external to the DVCC may be able to provide memory for the DVCC. Both memory 908 and persistent storage 910: (i) store data in a manner that is less transient than a signal in transit; and (ii) store data on a tangible medium (such as magnetic or optical domains). In this embodiment, memory 908 is volatile storage, while persistent storage 910 provides nonvolatile storage. The media used by persistent storage 910 may also be removable. For example, a removable hard drive may be used for persistent storage 910. Other examples include optical and magnetic disks, thumb drives, and smart cards that are inserted into a drive for transfer onto another computer-readable storage medium that is also part of persistent storage 910. Communications unit 902 provides for communications with other data processing systems or devices external to the DVCC.

I/O interface set 906 allows for input and output of data with other devices that may be connected locally in data communication with computer main unit 900. For example, I/O interface set 906 provides a connection to external device set 914. External device set 914 will typically include devices such as a keyboard, keypad, a touch screen, and/or some other suitable input device. External device set 914 can also include portable computer-readable storage media such as, for example, thumb drives, portable optical or magnetic disks, and memory cards. Software and data used to practice embodiments of the present invention, for example, program 300, can be stored on such portable computer-readable storage media. I/O interface set 906 also connects in data communication with display 912. Display 912 is a display device that provides a mechanism to display data to a user and may be, for example, a computer monitor or a smart phone display screen.

In this embodiment, program 999 is stored in persistent storage 910 for access and/or execution by one or more computer processors of processor set 904, usually through one or more memories of memory 908. It will be understood by those of skill in the art that program 999 may be stored in a more highly distributed manner during its run time and/or when it is not running. Program 300 may include both machine readable and performable instructions and/or substantive data (that is, the type of data stored in a database). In this particular embodiment, persistent storage 910 includes a magnetic hard disk drive. To name some possible variations, persistent storage 910 may include a solid state hard drive, a semiconductor storage device, read-only memory (ROM), erasable programmable read-only memory (EPROM), flash memory, or any other computer-readable storage media that is capable of storing program instructions or digital information.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Figure 7:
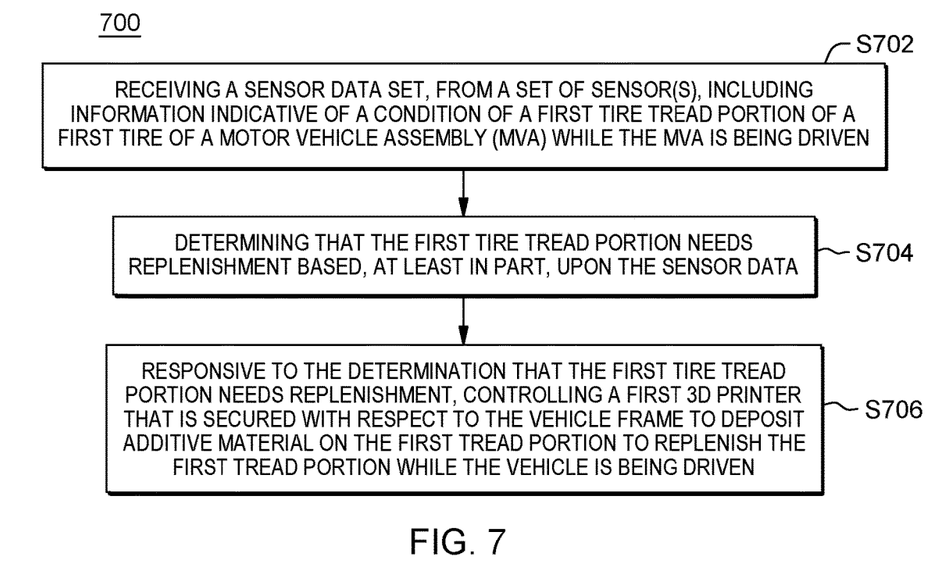
FIG. 7 is a flow chart of a method.

As shown in FIG. 7 flow chart 700 representing a method that includes operations described in the following three (3) paragraphs:

Operation 5702 is receiving a sensor data set, from a set of sensor(s), including information indicative of a condition of a first tire tread portion of a first tire of a motor vehicle assembly (MVA) while the MVA is being driven, Operation 5704 is determining that the first tire tread portion needs replenishment based, at least in part, upon the sensor data set, Operation 5706 is, responsive to the determination that the first tire tread portion needs replenishment, controlling a first 3D printer that is secured with respect to the vehicle frame to deposit additive material on the first tread portion to replenish the first tread portion while the vehicle is being driven.

Definitions

Present invention: should not be taken as an absolute indication that the subject matter described by the term "present invention" is covered by either the claims as they are filed, or by the claims that may eventually issue after patent prosecution; while the term "present invention" is used to help the reader to get a general feel for which disclosures herein are believed to potentially be new, this understanding, as indicated by use of the term "present invention," is tentative and provisional and subject to change over the course of patent prosecution as relevant information is developed and as the claims are potentially amended.

Embodiment: see definition of "present invention" above—similar cautions apply to the term "embodiment."

and/or: inclusive or; for example, A, B "and/or" C means that at least one of A or B or C is true and applicable.

Including/include/includes: unless otherwise explicitly noted, means "including but not necessarily limited to."

Module/Sub-Module: any set of hardware, firmware and/or software that operatively works to do some kind of function, without regard to whether the module is: (i) in a single local proximity; (ii) distributed over a wide area; (iii) in a single proximity within a larger piece of software code; (iv) located within a single piece of software code; (v) located in a single storage device, memory or medium; (vi) mechanically connected; (vii) electrically connected; and/or (viii) connected in data communication.

Computer: any device with significant data processing and/or machine readable instruction reading capabilities including, but not limited to: desktop computers, mainframe computers, laptop computers, field-programmable gate array (FPGA) based devices, smart phones, personal digital assistants (PDAs), body-mounted or inserted computers, embedded device style computers, application-specific integrated circuit (ASIC) based devices.

What is claimed is:

1. A vehicle comprising:
a vehicle including four tires, a first 3D printer and printer securing hardware that allows the first 3D printer to be secured in one of four positions respectively located and oriented so that the first 3D printer can be changed among and between the four positions so that each of the four tires can be serviced;
an electromechanical device located in or on the vehicle and structured and located to move the 3D printer among and between the four positions;
computer program product (CPP) comprising:
a set of storage device(s); and
non-transitory computer code stored on the set of storage device(s), with the computer code including data and instructions for causing a processor(s) set to perform at least the following operations:
receiving a sensor data set, from a set of sensor(s), including information indicative of a condition of a first tire tread portion of a first tire of a motor vehicle assembly (MVA) while the MVA is being driven,
determining that the first tire tread portion needs replenishment based, at least in part, upon the sensor data set, and
responsive to the determination that the first tire tread portion needs replenishment, controlling a first 3D printer that is secured with respect to the vehicle frame to deposit additive material on the first tread portion to replenish the first tread portion while the vehicle is being driven.

2. The CPP of claim 1 wherein the electromechanical device includes a robot that operates under control of computer code to move the 3D printer among and between the four positions.

3. The CPP of claim 1 wherein the control of the first 3D printer includes:
timing the deposition of the additive material based, at least in part, upon a rotational speed of the first tire.

4. The CPP of claim 1 wherein the control of the first 3D printer includes:
controlling a flow rate of the additive material based, at least in part, upon a rotational speed of the first tire.

5. The CPP of claim 1 wherein the control of the first 3D printer includes:
timing the deposition of the additive material based, at least in part, upon a road surface conditions.

* * * * *